United States Patent
Yahalom et al.

(10) Patent No.: US 9,560,055 B2
(45) Date of Patent: Jan. 31, 2017

(54) CLIENT-SIDE INTEGRATION FRAMEWORK OF SERVICES

(71) Applicant: Microsoft Corporation, Redmond, WA (US)

(72) Inventors: Saar Yahalom, Tel Aviv (IL); Bart J. F. De Smet, Bellevue, WA (US); Daniel Lee Massey, Redmond, WA (US); Douglas C. Burger, Bellevue, WA (US); Blaise Hilary Aguera y Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 14/265,656

(22) Filed: Apr. 30, 2014

(65) Prior Publication Data

US 2015/0319176 A1 Nov. 5, 2015

(51) Int. Cl.
*G06F 21/00* (2013.01)
*H04L 29/06* (2006.01)
(Continued)

(52) U.S. Cl.
CPC ....... *H04L 63/105* (2013.01); *G06F 17/30861* (2013.01); *G06F 21/31* (2013.01); *G06F 21/6245* (2013.01)

(58) Field of Classification Search
CPC G06F 21/6245; G06F 21/31; G06F 17/30861; H04L 63/105
See application file for complete search history.

(56) References Cited

U.S. PATENT DOCUMENTS 6,141,754 A * 10/2000 Choy ................. G06F 21/6218
705/52
6,260,035 B1 7/2001 Horvitz et al.
(Continued)

FOREIGN PATENT DOCUMENTS

EP 1835417 A1 9/2007
EP 2043009 A1 4/2009
(Continued)

OTHER PUBLICATIONS

"International Search Report and Written Opinion Issued for PCT Patent Application No. PCT/US2015/027406", Mailed Date: Jul. 7, 2015, 9 Pages.
(Continued)

*Primary Examiner* — Kendall Dolly
(74) *Attorney, Agent, or Firm* — Steve Spellman; Tom Wong; Micky Minhas

(57) ABSTRACT

Systems and methods for providing client-side integration of apps and services is provided. An integration framework execution upon a computing device provides integration of various apps, applications, services, sensors and the like. Upon receiving a request for a service, the integration framework accesses a registry of a plurality of services of a respective plurality of providers registered with the integration framework. Each of the services is registered with the integration framework is associated with a trust level of a hierarchy of trust levels. The integration framework iteratively searches the registry for a provider of the requested service according to the hierarchy of trust levels, beginning with the most trusted level of the trust levels to the less trusted trust level until a provider of the requested service is found or until all levels of the hierarchy are searched without finding a provider of the requested service.

19 Claims, 7 Drawing Sheets

(51) Int. Cl.
  *G06F 21/31* (2013.01)
  *G06F 21/62* (2013.01)
  *G06F 17/30* (2006.01)

(56) References Cited

U.S. PATENT DOCUMENTS

| | | | |
|---|---|---|---|
| 7,664,081 | B2 | 2/2010 | Luoma et al. |
| 7,716,492 | B1 | 5/2010 | Saulpaugh et al. |
| 7,987,163 | B2 | 7/2011 | Keshavarz-Nia et al. |
| 8,086,658 | B2 | 12/2011 | Wagner et al. |
| 8,131,718 | B2 | 3/2012 | Tran |
| 8,340,651 | B1 | 12/2012 | Gailloux et al. |
| 8,386,929 | B2 | 2/2013 | Zaika et al. |
| 8,417,233 | B2 | 4/2013 | Woloshyn |
| 8,493,888 | B2 | 7/2013 | Palin et al. |
| 8,560,400 | B1 | 10/2013 | Lee |
| 8,612,435 | B2 | 12/2013 | Sambrani et al. |
| 8,649,776 | B2 | 2/2014 | Tofighbakhsh et al. |
| 8,660,849 | B2 | 2/2014 | Gruber et al. |
| 2002/0129339 | A1 | 9/2002 | Callahan, II |
| 2005/0097087 | A1 | 5/2005 | Punaganti Venkata et al. |
| 2005/0138173 | A1 | 6/2005 | Ha et al. |
| 2007/0083378 | A1 | 4/2007 | Guarraci et al. |
| 2007/0100790 | A1 | 5/2007 | Cheyer et al. |
| 2007/0141984 | A1 | 6/2007 | Kuehnel et al. |
| 2007/0264991 | A1 | 11/2007 | Jones et al. |
| 2008/0313639 | A1 | 12/2008 | Kumar et al. |
| 2010/0009703 | A1 | 1/2010 | Sornay |
| 2010/0017853 | A1* | 1/2010 | Readshaw ............. H04L 63/102 726/3 |
| 2010/0281427 | A1 | 11/2010 | Ghosh et al. |
| 2011/0182205 | A1 | 7/2011 | Gerdes et al. |
| 2011/0302182 | A1 | 12/2011 | Crawford |
| 2012/0115453 | A1 | 5/2012 | Zheng |
| 2012/0117005 | A1 | 5/2012 | Spivack |
| 2012/0210326 | A1 | 8/2012 | Torr et al. |
| 2012/0296955 | A1 | 11/2012 | Schmidt et al. |
| 2012/0316956 | A1 | 12/2012 | Nath et al. |
| 2012/0323794 | A1 | 12/2012 | Livshits |
| 2012/0324259 | A1 | 12/2012 | Aasheim et al. |
| 2013/0040615 | A1 | 2/2013 | Sawhney et al. |
| 2013/0080184 | A1 | 3/2013 | Streat |
| 2013/0097289 | A1 | 4/2013 | Alsterlid et al. |
| 2013/0159377 | A1 | 6/2013 | Nash |
| 2013/0244636 | A1 | 9/2013 | Shukla et al. |
| 2013/0275164 | A1 | 10/2013 | Gruber et al. |
| 2014/0033204 | A1 | 1/2014 | Dodge et al. |
| 2014/0040171 | A1 | 2/2014 | Segalov et al. |
| 2014/0053260 | A1 | 2/2014 | Gupta et al. |
| 2014/0074483 | A1 | 3/2014 | van Os |
| 2014/0108307 | A1 | 4/2014 | Raghunathan et al. |
| 2014/0122603 | A1* | 5/2014 | Walsh ................... H04L 65/403 709/204 |
| 2014/0201647 | A1 | 7/2014 | Scherpa |
| 2014/0372429 | A1 | 12/2014 | Ziklik |

FOREIGN PATENT DOCUMENTS

| | | |
|---|---|---|
| WO | 0145005 A1 | 6/2001 |
| WO | 2009021265 A1 | 2/2009 |
| WO | 2012112404 A2 | 8/2012 |

OTHER PUBLICATIONS

Oaks, et al. "Capabilities: Describing What Services Can Do", In Proceedings of 1st International Conference on Service-Oriented Computing, Dec. 15, 2003, 16 pages.

Raverdy, et al., "Efficient Context-Aware Service Discovery in Multi-Protocol Pervasive Environments", In Proceedings of the 7th International Conference on Mobile Data Management, May 9, 2006, 8 pages.

Papazoglou, et al., "Service-Oriented Computing", In Communications of the ACM, vol. 46, Issue 10, Oct. 2003, 4 pages.

Pokraev, et al., "Extending UDDI with Context-Aware Features Based on Semantic Service Descriptions", In Proceedings of the International Conference on Web Services, Jun. 23, 2003, 7 pages.

Rompothong, et al., "A Query Federation of UDDI Registries", In Proceedings of the 1st International Symposium on Information and Communication Technologies, Sep. 24, 2003, 6 pages.

Khutade, et al., "QOS Based Web Service Discovery Using OO Concepts", In International Journal of Advanced Technology & Engineering Research, vol. 2, Issue 6, Nov. 2012, 6 pages.

Tian, et al., "Web Service Discovery with UDDI Based on Semantic Similarity of Service Properties", In Third International Conference on Semantics, Knowledge and Grid, Oct. 29, 2007, 4 pages.

"International Preliminary Report on Patentability Issued in PCT Application No. PCT/US2015/027406", Mailed Date: Mar. 29, 2016, 6 Pages.

Ra, et al., "Improving Energy Efficiency of Personal Sensing Applications with Heterogeneous Multi-Processors", In Proceedings ACM Conference on Ubiquitous Computing, Sep. 5, 2012, 10 pages.

"iOS App Programming Guide", Published on: Oct. 18, 2011, Available at: https://developer.apple.com/library/ios/documentation/iPhone/Conceptual/iPhoneOSProgrammingGuide/ManagingYourApplicationsFlow/ManagingYourApplicationsFlow.html#//apple_ref/doc/uid/TP40007072-CH4.

"Core Bluetooth Programming Guide", Published on: Aug. 16, 2013, Available at: https://developer.apple.com/library/ios/documentation/NetworkingInternetWeb/Conceptual/CoreBluetooth_concepts/CoreBluetoothBackgroundProcessingForIOSApps/PerformingTasksWhileYourApplsInTheBackground.html.

Stakic et al., "Design Issues in Minimizing Infrastructure Requirements of Mobile Social Software Introduction System", In Proceedings of the Third International Conference on Privacy, Security and Trust and IEEE International Conference on Social Computing, Oct. 9, 2011, pp. 583-586.

Bluetooth SIG, "Bluetooth Specification—Phone Book Access Profile (PBAP) V10ROO", vol. PBAP_SPEC, No. V1OROO, Jul. 24, 2006, 41 Pages.

Lugano, et al., "To Share or Not to Share: Supporting the User Decision in Mobile Social Software Applications", In Proceedings of 11th International Conference on User Modeling, Jul. 25, 2007, 5 Pages.

Yorke-Smith, et al., "Like an Intuitive and Courteous Butler: A Proactive Personal Agent for Task Management", In Proceedings of 8th International Joint Conference on Autonomous Agents and Multiagent Systems, May 10, 2009, pp. 337-344.

"Sherpa, Superior Intelligent Personal Assistant", Published on: Apr. 17, 2013 Available at: http/fwww.businesswire.com/news/home/20130417005930/en/Sherpa-Superior-Intelligent-Personal-Assista nt-U.S.Market#.U4XOOfmSzHo.

Gil, et al., "Towards Intelligent Assistance for To-Do Lists", In Proceedings of the 13th International Conference on Intelligent user Interfaces, Jan. 13, 2008, pp. 1-4.

Johnson, et al., "Hyundai's Second Generation Blue Link Technology Now Powered by Google and Provides Intelligent Assistance", Published on: Jan. 6, 2014 Available at: http:/fwww.hyundainews.com/us/en-us/media/pressrelease.aspx?mediaid=40200&title=la-tecnologia-blue-link-de-segunda-generacion-de-hyundai-es-facilitada-ahora-por-google-y-brinda-asistencia-inteligente.

Koch, et al., "Classification of Agents-based Mobile Assistants", In Proceedings of Workshop on Agents for Ubiquitous Computing, Mar. 10, 2004, 12 pages.

Botla, Purushotham, "Designing Personal Assistant Software for Task Management using Semantic Web Technologies and Knowledge Databases", In Working Paper CISL, May 20, 2013, 112 pages.

"Apple—iOS 7—Siri", http:/fwww.apple.com/ios/siri/, downloaded Mar. 14, 2014, 3 pages.

"5 Free Siri Alternatives for Android—Which is the Best?", downloaded Mar. 14, 2014, 7 pages.

"Non-final Office Action from U.S. Appl. No. 14/219,501", Mailed Date: Nov. 5, 2015, 10 pages.

"International Search Report and Written Opinion Issued in PCT Application No. PCT/US2015/016726", Mailed Date: May 6, 2015, 12 Pages.

(56) References Cited

OTHER PUBLICATIONS

"Second Written Opinion of the International Preliminary Examining Authority", as cited in PCT/US2015/016726, Mailed Dec. 8, 2015, 5 pages.
"Non-final Office Action from U.S. Appl. No. 14/187,567", Mailed Date: Jul. 21, 2015, 17 pages.
"Final Office Action from U.S. Appl. No. 14/187,567", Mailed Date: Mar. 21, 2016, 13 pages.
"International Search Report and Written Opinion Issued in PCT Application No. PCT/US2015/016727", Mailed Date: May 21, 2015, 9 Pages.
"Second Written Opinion Issued in PCT Application No. PCT/US2015/016727", Mailed Date: Nov. 17, 2015, 5 pages.
"International Preliminary Report on Patentability Issued in PCT Application No. PCT/US2015/016727", Mailed Date: Feb. 11, 2016, 7 Pages.
"Notice of Allowance from U.S. Appl. 14/265,882" Mailed Date: Aug. 14, 2015, 9 pages.
"International Search Report and Written Opinion Issued in PCT Application No. PCT/US2015/016728", Mailed Date: May 18, 2015, 10 Pages.
"Second Written Opinion Issued in PCT Application No. PCT Application No. PCT/US2015/016728" Mailed Date: Dec. 9, 2015, 6 pages.
"Non-final Office Action from U.S. Appl. No. 14/274,650", Mailed Date: Oct. 2, 2015, 11 pages.
"International Search Report and Written Opinion Issued in PCT Application No. PCT/US2015/016729", Mailed Date: May 20, 2015, 9 Pages.
"Second Written Opinion Issued in PCT Application No. PCT/US2015/016729", Mailed Date: Jan. 14, 2016, 5 Pages.
U.S. Appl. No. 14/219,501, Non Final Office Action mailed Jul. 15, 2016, 12 pages.
U.S. Appl. No. 14/187,567, Notice of Allowance mailed Jun. 15, 2016, 9 pages.
"Notice of allowance and Fee(s) Due issued in U.S. Appl. No. 14/274,650", Mailed Date: Apr. 29, 2016, 8 Pages.
"International Preliminary Report on Patentability Issued in PCT Application No. PCT/US2015/016726", Mailed Date Apr. 18, 2016, 8 pages.
"International Preliminary Report on Patentability Issued in PCT Application No. PCT/US2015/016728", Mailed Date: Apr. 20, 2016, 7 Pages.
"International Preliminary Report on Patentability Issued in PCT Application No. PCT/US2015/016729", Mailed Date: Apr. 18, 2016, 7 pages.

* cited by examiner

CLIENT-SIDE INTEGRATION FRAMEWORK OF SERVICES

RELATED APPLICATIONS

This application is related to U.S. patent application Ser. No. 14/187,567, entitled "Local Personal Daemon," filed Feb. 24, 2014, which is incorporated herein by reference. This application is also related to U.S. patent application Ser. No. 14/274,650, entitled "Accelerated Training of Personal Daemons," filed May 9, 2014; to U.S. patent application Ser. No. 14/219,501, entitled "Personal Daemon Interaction through Escalating Disclosure," filed Mar. 19, 2014; and to U.S. patent application Ser. No. 14/265,882, entitled "Incentive-Based Device Performance," filed Apr. 30, 2014.

BACKGROUND

One aspect of utilizing mobile computing devices is that the device includes, and a user will install, various apps to carry out one or more services. Generally speaking, an "app" is a small, specialized software program directed to performing a task or a small set of related tasks. Quite often, the collections of apps on a mobile device represent programs from multiple vendors. Moreover, each app will typically be designed to operate independently of another app or application and, as such, will maintain its own set of user data (data relating to the device user, including personal information).

In addition to a mobile computing device, it is quite common for a person/user to own and/or use other computing devices. For example, in the course of a day a user may use his or her smart phone as well as one or more other computing devices such as a tablet computer, a laptop computer, a game console, and a desktop computer. Each of these devices (each being a computing device) has different capabilities than the others and will have at least some apps and/or applications that are not installed on all other devices—though there may be some overlap of apps between some or all devices. Further, each of these computing devices is stores and/or maintains personal information (passwords, preferences, demographic information, account information, location, etc.) about the user.

While a collection of apps can provide a robust set of features/services for the benefit of the user, the user is often the integration point of the services and content provided by each of the apps. However, more and more users are interested in having their computing device (or computing devices) understand them and, based on that understanding provide personalized assistance tailored to their specific needs and context.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for providing client-side integration of apps and services is provided. An integration framework execution upon a computing device provides integration of various apps, applications, services, sensors and the like. Upon receiving a request for a service, the integration framework accesses a registry of a plurality of services of a respective plurality of providers registered with the integration framework. Each of the services is registered with the integration framework is associated with a trust level of a hierarchy of trust levels. The integration framework iteratively searches the registry for a provider of the requested service according to the hierarchy of trust levels, beginning with the most trusted level of the trust levels to the less trusted trust level until a provider of the requested service is found or until all levels of the hierarchy are searched without finding a provider of the requested service.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
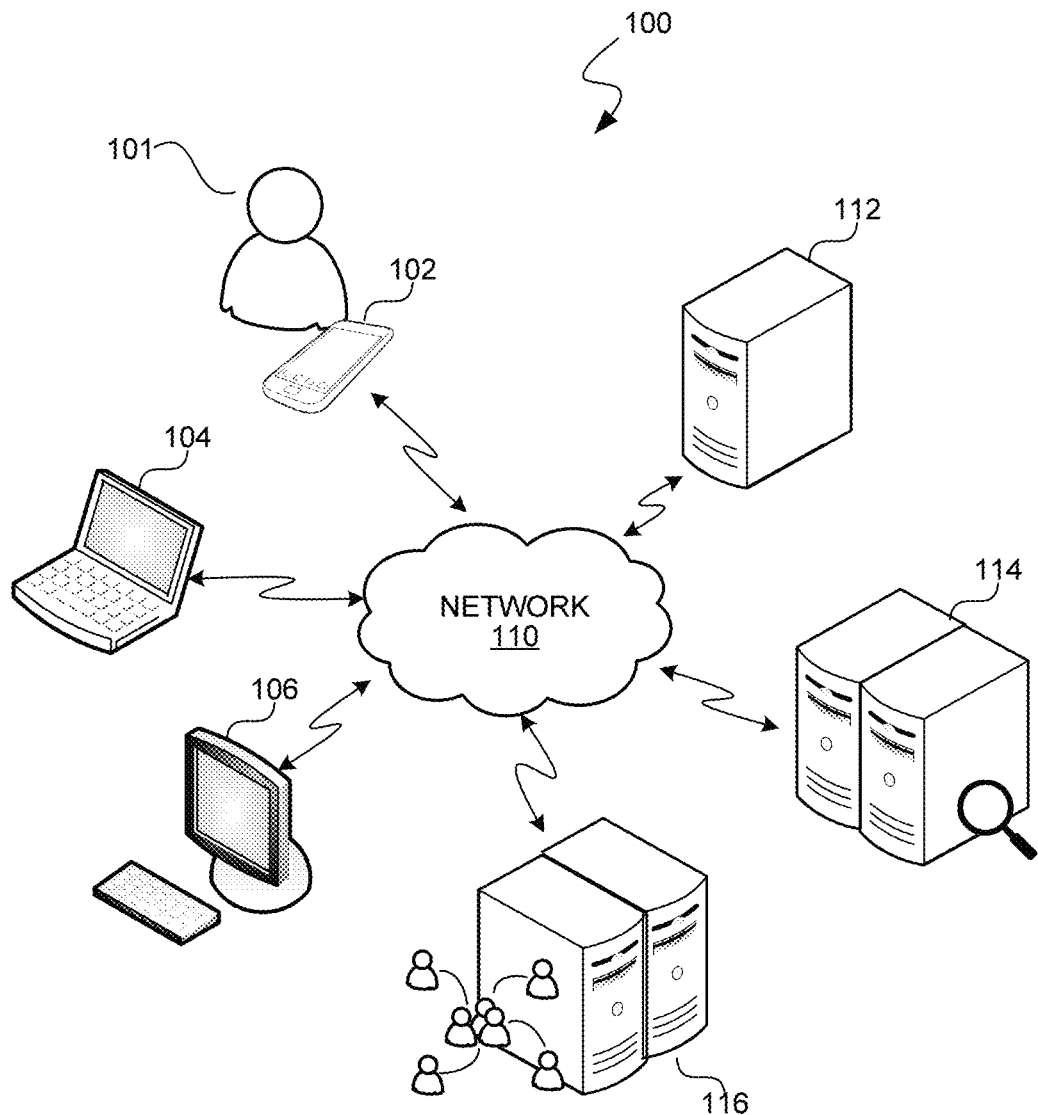
FIG. 1 illustrates an exemplary network environment suitable for implementing aspects of the disclosed subject matter.

For purposes of clarity, the term "exemplary" in this document should be interpreted as serving as an illustration or example of something, and it should not be interpreted as an ideal and/or a leading illustration of that thing. The term "personal information" corresponds to information, data, metadata, preferences, behaviors, of the associated user, as well as rules for interacting with the user. Generally speaking, personal information is information about the associated user that represents some aspect of the user. The personal information may comprise data such as (by way of illustration and not limitation) gender, age, education, demographic data, residency, citizenship, and the like. Personal information may also comprise preferences and interests, expertise, abilities, and the like. Still further, personal information may comprise rules (including rules established by the associated user as well as rules that are learned and/or inferred through analysis as described below) for interacting with the associated user in providing personal assistance.

As mentioned above, the term "app" is a reference to a typically small, specialized software program directed to performing a task or a small set of related tasks on a computing device. Apps may be pre-installed on the computing device or may be installed at the direction of the user of the computing device. The term "application" is a reference to a software program that carries out one or more tasks on a computing device. Typically, an application is more broad and robust in scope than an app, but both an app and an application are software programs. As both apps and applications are software programs and both may be installed on computing devices suitable for implementing aspects of the disclosed subject matter, for purposes of brevity the term (and unless specifically identified to the contrary), subsequent reference to the term "app" should be interpreted as encompassing both apps and applications.

As will be discussed below, the integration framework integrates apps and sensors, both those disposed locally on a computing device as well as those that are available on other devices (such as sibling devices). Of course, apps and sensors, devices, etc. individually may provide data, data streams, functionality, activities and the like. For purposes of this disclosure, the data, data streams, functionality, features, activities of the various apps, sensors, devices, etc., that are registered with the integration framework, will be referred to as services (data, streams, functionality, etc.) provided by providers (apps, sensors, devices, etc.).

One solution in providing personalized assistance is to deploy an online service that can provide personalized assistance to a large number of subscribers by utilizing a large numbers of computers and/or processors that gather, store, collate, analyze and manipulate large amounts of data gathered from all over the world. In this monolithic model, all of the apps on the user's various computers rely upon this monolithic online service to provide the services that the user desires. Typically, subscribers (those wishing to receive personalized assistance) various items of personal information to the online service via the apps and permit the online service to monitor numerous aspects of the subscribers' lives to learn as much personal information about them as possible. Nearly every activity a subscribers might take (especially with regard to their computers) is captured and analyzed to identify addition personal information; these activities including but not limited to online behaviors, purchases, preferences, affiliations, banking information, etc. The online service then uses its computing power to provide personalized assistance, based on the amassed personal information that it gathers and maintains of its subscribers.

Running a massive monolithic online service, as described above, is expensive. In order to keep such a large online service operational, the online service must have a revenue stream. On the other hand, subscribers/individual users want their personalized assistance for free. Rather than directly charging the subscribers a fee for the personalization service, the monolithic online service generates its revenue stream by monetizing the personal information of its subscribers. A common phrase for this monetization is "ad-funded" or "vendor-funded." The online service monetizes the personal information of its subscribers by identifying individuals among its subscribers having various traits, interests, demographics, and attributes (as determined by the personal information that the online service has received and learned of its subscribers) and monetizing the identified information by placing advertisements to those individuals on behalf of advertisers. Of course, selling advertisements directed to its subscribers is only one way in which the monolithic online service (as described above) can monetize the personal information of its subscribers. Alternatively, the online service may simply sell contact lists and/or information. Of course, selling contact lists and/or information regarding subscribers raises concerns regarding a person's privacy.

Subscribers are often delighted to receive "free" personalized assistance, so much so that they tolerate the advertisements that are frequently presented to them. Moreover, they are largely unaware of and would likely be extremely uncomfortable with how much of their personal information the online services possesses and monetizes/exposes to third parties (e.g., advertisers, vendors, organizations, etc.) Of course, an online service might placate its subscribers by telling stating that it will do no harm to its subscribers, yet the online service is conflicted: the online service generates revenue by providing personal information of its subscribers to third parties (whether by advertisements, selling contact lists, etc.). Moreover, the more specific the personal information that is provided to third parties, the greater the monetary reward is for the online service. Unfortunately, the more specific personal information that is exposed, the greater the risk and the more potential for abuse to the person or persons of the exposed personal information.

Figure 4:
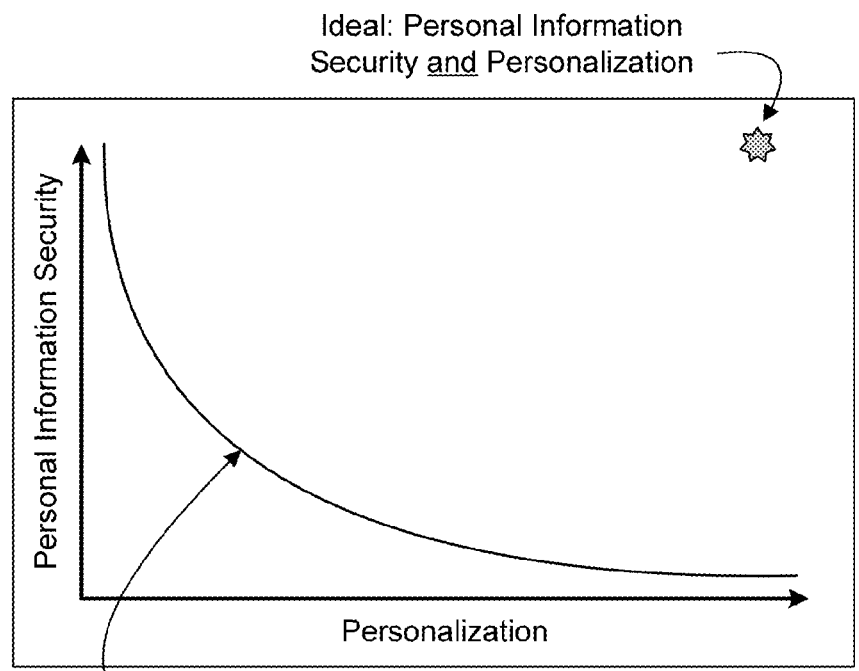
FIG. 4 illustrates a graph of showing the relationship of personal information security as a function of increased personalization (with the commensurate increased amount of access to personal information)

Of course, even without considering the risk of exposing personal information to known third parties (who may or may not show restraint with a user's personal information), frequent and unfortunate occasions illustrate that by simply storing substantial personal information for a large number of users/subscribers an online service creates an inviting, enticing target for identity thieves. So, while the level of personalized assistance can be directly correlated to the amount of personal information that is known of a person, the personal security of that person (as posed by the risk of exposure or misuse the personal information) is also a function of the amount of personal information of the person that the online service possesses. As shown in FIG. 4, while the ideal would be high personal security (i.e., security in personal information) and high personalization, in reality with a monolithic online service the level of personal security (with regard to one's personal information) decreases the as level of personalization increases.

In contrast to a monolithic online service and according to aspects of the disclosed subject matter, a personal daemon operating on a person's own computing device (or computing devices) is set forth in related U.S. patent application Ser. No. 14/187,567, filed Feb. 24, 2014, entitled "Local Personal Daemon." As set forth in the related application and by way of definition, a "daemon" is a process or thread of execution, run on a computing device, which is executed in the background of the computing device rather than being executed under the direct control of a computer user. However, while a daemon executes in the background of the computing device, a computer user can interact with a daemon and, through the interaction, direct the activities of the daemon. Further, a "personal daemon" is a daemon that has access to, acquires, infers, maintains, and acts upon personal information of a computer user in providing personalized assistance. A personal daemon monitors numerous aspects of an associated user's activities to identify, infer, and/or learn additional personal information (when and where available) regarding the user as well as inferring and learning rules for acting on the user's behalf, i.e., providing personalized assistance to the user. Additionally, a personal daemon may learn and/or confirm personal information, particularly in regard to inferred information and/or rules for acting on the user's behalf, regarding the user through dialog and other interaction with the user, including confirming previously derived inferences regarding the user, requesting user preferences and other personal information, and the like. A "local personal daemon" is a personal daemon that executes "locally," i.e., on the user's computing device. Because the local personal daemon executes on the user's computing device but has access to services and information on a network, the local persona daemon is said to operation "on the edge of the cloud." For purposes of this disclosure, a "personal daemon" and a "local personal daemon" should be viewed as being synonymous.

The phrase "personal assistance," in the context of a personal daemon providing personal assistance to the associated user, should be interpreted as carrying out one or more actions on behalf of the user based. Typically, though not exclusively, the personal assistance is triggered by one or more events related to aspects of the user's current context. By way of example and not limitation, the one or more actions of personal assistance may include: providing a recommendation to the user that the user take a particular action; obtaining data and/or services on the user's behalf; confirming with the user the inference of personal information from analysis of the user's activities; confirming with the user authorization for the personal daemon take an action on behalf of the user; providing a notification to the user regarding one or more events; providing alternatives to current user activities; recommending a venue; executing an action on behalf of the user on the computing device; recommending alternative and/or related activities or items; and the like. Unlike the monolithic online service option that gathers and monetizes personal information of its subscribers, a personal daemon does not share the associated user's personal information with other, third-party entities, except for and according to rules and directives established by the user.

According to aspects of the disclosed subject matter, a personal daemon executing on a user's computing device becomes the integration point of the various services available on or through a user's computing device. The computing device includes a client-side integration framework upon which the personal daemon relies in providing personalized assistance to the user associated with the computing device. As those skilled in the art will appreciate, in this context a "framework" is a collection of executable processes and services (executable on the computing device) that provide a particular set of functionality. In the case of this disclosure, that functionality is the integration of services, including both local services as well as those that do not reside on the local computing device. The integration framework is a "client-side" integration framework as it is implemented on the user's (i.e., client's) computing device rather than on remote devices in the cloud—though an integration framework can cooperate with and obtain services from remote sources. One such client-side integration framework is the On{Event} framework discussed in the "Local Personal Daemon" patent application. According to aspects of the disclosed subject matter and as will be discussed in greater detail, the integration framework implements a "local first" pattern for obtaining services.

Turning now to FIG. 1, FIG. 1 is a block diagram illustrating an exemplary network environment 100 suitable for implementing aspects of the disclosed subject matter. As shown, the network environment 100 includes one or more user computing devices 102-106. At least some of the user computing devices are suitably configured to host a personal daemon and corresponding integration framework, such as user computing device 102 associated with user 101. As will be readily appreciated by those skilled in the art, suitable user computing devices include, by way of illustration and not limitation: tablet computing devices; smart phone devices, such as computing device 102; the so-called "phablet" computing devices (i.e., computing devices that straddle the functionality of typical tablet computing devices and smart phone devices); laptop computers; desktop computers; wearable computing devices; personal digital assistants; game consoles; and the like.

The network environment 100 also includes a network 110 by which the user computing devices 102-106 can communicate with and access network accessible devices and/or services distributed throughout the network. For example and as shown in FIG. 1, also communicatively connected to the network 110 are network service providers 112-116. Network service providers are online services (supported by computing devices) that provide one or more services to others, including users such as user 101. These network service providers 112-116 include, by way of illustration and not limitation: social network service providers, such as network service provider 116; search engines, such as search engine 114; traffic information providers, such as traffic information provider 112; news services (not shown); weather services (not shown); online game services (not shown); banking services (not shown); and the like. Indeed, it seems as though any type of service that may be desired may be obtained from an online service (either for free or for a fee).

According to aspects of the disclosed subject matter and as will be discussed in greater detail below, a user computing device (such as user computing device 102) with an integration framework is implemented as an "edge of the cloud" device, meaning that while local processing occurs, the computing device can obtain services over the network 110 from other computing devices and network service providers.

It should be readily appreciated by those skilled in the art that many users have/make use of more than one computing device. Indeed, it is common for a user to have, by way of illustration, a smart phone as well as a tablet computing device, a laptop computer, and/or a desktop computer. Thus, according to aspects of the disclosed subject matter, a personal daemon operating on a computing device, such as computing device 102, may be configured to share personal information regarding the associated computer user 101 with similarly configured "sibling computing devices," i.e., computing devices associated with the same user, each being configured with an integration framework. For example, user computing devices 102-104 may be sibling computing device for computer user 101. As will be discussed in greater detail below, services registered with an integration framework on a sibling computing device enjoys a level of trust such that those services are generally preferred over services that may be available from other sources.

Figure 2:
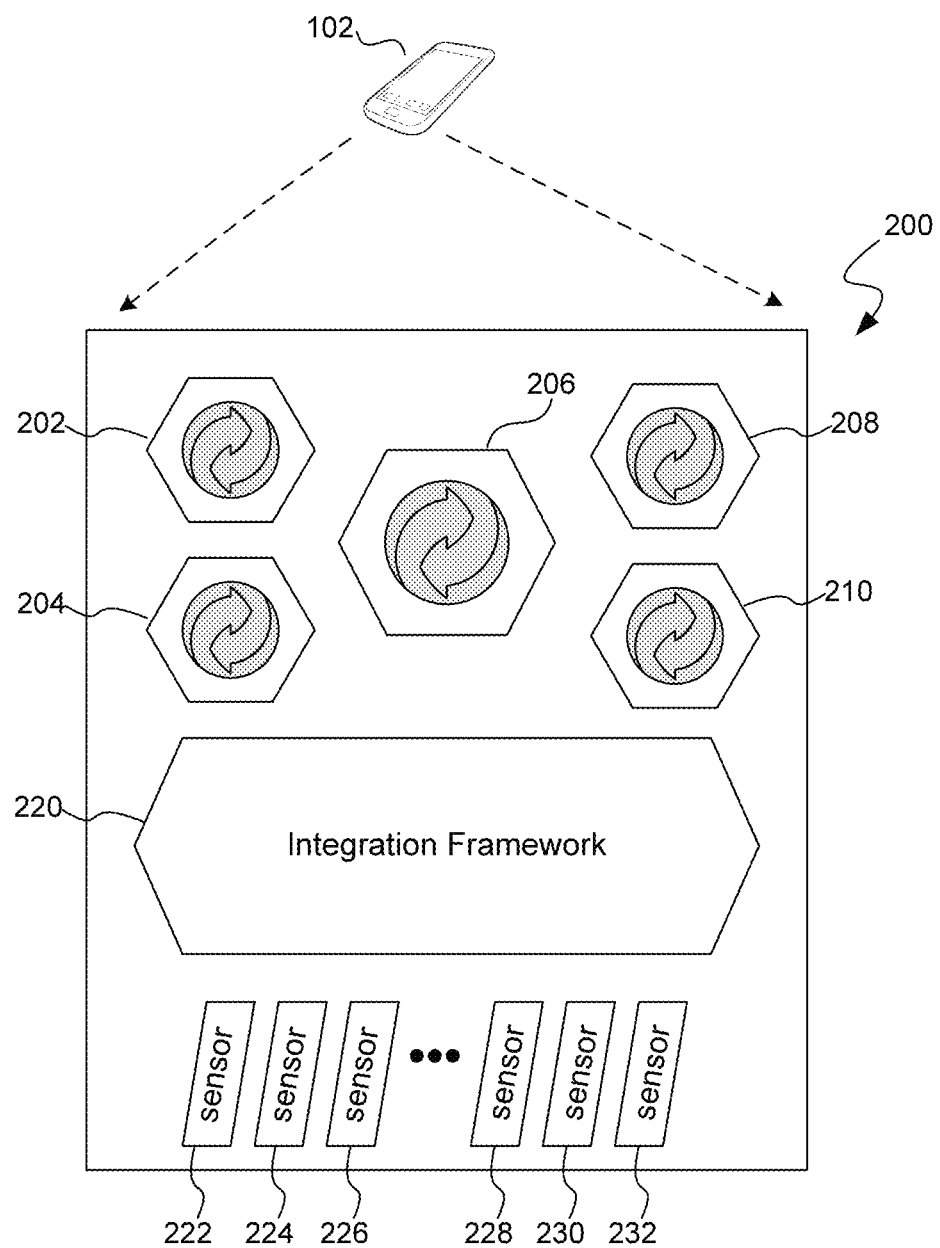
FIG. 2 illustrates various components and processes in execution on a computing device in providing client-side integration of apps and services.

In regard to the configuration of a suitable user computing device, FIG. 2 illustrates a diagram 200 of various components and processes hosted on a suitably configured user computing device, such as user computing device 102, in providing client-side integration of apps and services. The user computing device 102 includes one or more apps or services, such as apps 202-210 executing (or executable) on the computing device. Included among the apps on the computing device 102 is a personal daemon 206 executing on behalf of the associated user 101.

Also executing on the suitably configured user computing device 102 is the integration framework 220. The integration framework 220 is an extensible event/action framework, i.e., the framework detects the occurrence of events with regard to one or more sensors (such as the exemplary sensors 222-232) or services and, in response, executes one or more actions associated with the detected events on the user computing device. The sensors 222-232 correspond to hardware sensors on the user computing device, such as geographic sensors, accelerometers, timers, network event sensors, power source sensors, processor load sensors, light and audio sensors, and the like. Of course, apps and services, 202-210 may also be registered as software sensors in that they generate events based on certain criteria, such as check-ins, likes, text messages, etc. The integration framework 220 is extensible in that sensors, including software sensors, can be added/registered with the framework and actions can be added and/or removed as services; and other apps and applications (including the integration framework 220) can subscribe to the sensed events of the sensors. Accordingly, while not shown, the integration framework 220 includes a subscription interface by which one or more apps or applications can subscribe to the services of the sensors, as well as a publisher interface by which providers of services (apps, applications, sensors, devices, etc.) can "publish" to the integration framework the services provided, as well as how to invoke the service. The integration framework 220 also includes an input interface (not shown) by which the various sensors/services 222-232 send notifications to the framework. In addition to the providers of services mentioned above, other less traditional providers may also be used by the integration framework 220 including scripts, compute graphs, and/or orchestrations over existing providers.

Regarding the extensibility of the integration framework 220, it should be appreciated that apps (or applications) and services may register with the integration framework to subscribe to events from other sensors, services, and/or apps. Upon receiving notice of a subscribed event, the subscribing apps and services may then use the information from the subscribed sources to generate additional data and/or functionality. Of course, these subscribing apps and services may publish the data, services, and/or functionality that they generate through the integration framework 220 such that still other apps may subscribe to their services. In short, an app (or application or service) may register with the integration framework 220 as both a consumer of services/data/functionality of other apps and services, and also register as a publisher/producer of services or data or functionality that can be utilized by other services and apps.

In various embodiments of the disclosed subject matter and as a design implementation feature, when an app (or service) subscribes as a consumer of another app (or sensor or service), the integration framework 220 may provide information and/or the ability of the subscribing app to receive the subscribed service without further involvement of the integration framework 220. Of course, in alternative embodiments, the integration framework 220 may providing the "linking" aspect between a producing service and a consuming service.

A subscribing/consuming service may subscribe to all or specific ones of producing services that provide a particular service (or data or functionality.) For example, a subscribing service or app may subscribe to both a sensor that detects/reports the current power levels of a battery on the local computing device, as well as a publishing service that consumes the data of the sensor and generates additional detail regarding how long the local computing device can continue to operate at current processing levels given the current power levels. Under the integration framework 220, an app may subscribe to a specific producing service/app or, alternatively, to a set of producing services/apps according to the type of data/service/functionality desired.

According to aspects of the disclosed subject matter, the sensors and services 222-232 (including both hardware and software sensors and services) that are available on the computing device 102 are registered with the integration framework 220. Registration of an app, device or sensor comprises informing the integration framework of the nature of the service (or services) that is provided by the registered entity, and informs the framework of the nature of the event that may be triggered and received by the framework. As indicted above, registration with the integration framework 220 informs the framework of how to communicate with the provider of a service such that it can be invoked to provide the service. Through the information in the registry, other apps, applications or services can see the data and/or service (s) provided on the entire system and either subscribe to the event (or events) generated by the registered service/sensor or can execute the registered app/application/sensor to benefit from its service(s) and data. The personal daemon 206, acting as the integration point of the various apps and services for the associated user subscribes to the apps and services of the integration framework 220 in providing personal assistance to the user.

According to various embodiments of the disclosed subject matter, registration of a service with the integration framework 220 is conducted as part of the installation process of the service on the computing device. According to one embodiment, registration with the integration framework 220 may occur according to a manifest associated with the service. Alternatively, a service may be configured to communicate its registration information with the integration framework as part of the initialization/installation process. Alternatively, upon the installation of a service, the integration framework 220 may be configured to consult a global list of registration information. In yet an alternative embodiment, the associated user may manually add the registration information of a service to the integration framework 220.

Figure 3:
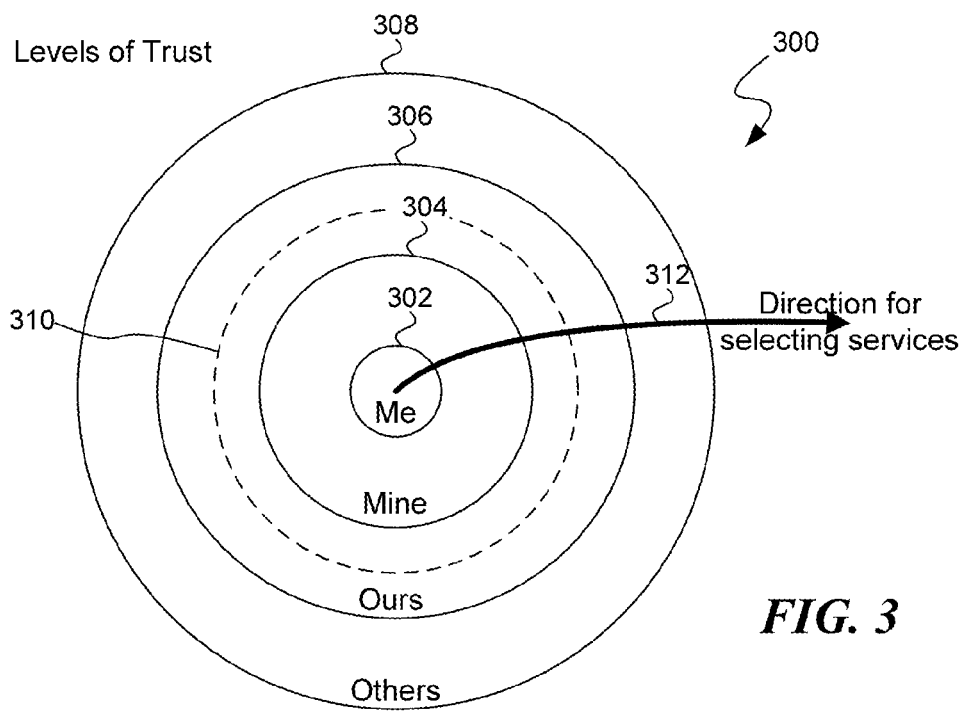
FIG. 3 illustrates levels of trust and order of execution of apps and services on a mobile computing device.

According to aspects of the disclosed subject matter, in addition to storing information regarding the services of each provider, each service registered with the integration framework is associated with a trust level of a hierarchy of trust levels. The trust level is generally indicative of the trust that the associated user has with regard to the service. Turning to FIG. 3, local services (i.e., those located on the computing device with the integration framework 220) are typically associated with the highest level of trust, characterized in FIG. 3 as the "me" level 302. As already mentioned, services not on the local device may also be registered with the integration framework 220. Indeed, services on sibling computing devices occupy a similarly high level of trust, a second-most trusted level, referred to in FIG. 3 as the "mine" level 304. Those services that an associated user may consider to be trusted, e.g., services from devices on networks of which the user is a member or to which the associated user is authorized to access, may be accorded a lessened level of trust, a third-most level of trust, referred to in FIG. 3 as the "ours" level 306. Those services that are available to the integration framework 220 on the computing device 102 but not necessarily associated with higher levels of trust are typically included in the lowest level of trust, referred to in FIG. 3 as the "others" level 308.

According to aspects of the disclosed subject matter, when a request for a service is received by the integration framework 220, the integration framework generally attempts to satisfy the request with services that are most trusted, i.e., residing in the "me" level of trust. Failing to find a matching service in the most trusted level, the integration framework 220 will successively look to outer levels to satisfy the request, as indicated by arrow 312. Of course, there may be times that it is advantageous to obtain services from service providers that do not reside on the local computing device in spite of the service being available on the local device. For example (by way of illustration and not limitation), if battery power is low and a particular service is known to consume substantial amounts of power, it may be advantageous to obtain the service from a computing device other than the local computing device. Similarly, processing availability and capacity, memory constraints, data availability, network bandwidth, network connectivity rates, time of day, and the like may all be considered in determining whether to obtain a service from providers/sensors on the local computing device (those the "me" level 302 of trust) or to obtain the service from an outer level of trust, particularly in the "mine" level 304 of trust.

Also shown in FIG. 3 is an ad hoc trust level 310. According to aspects of the disclosed subject matter, a user may temporarily establish an ad hoc network with another device (e.g., a temporary network between two mobile devices) for the purpose of inter-communicating, providing data to another, etc. Accordingly, the integration framework 220 may temporarily associate an "ad hoc" level 310 of trust to the apps/services/sensors of the devices on the ad hoc network for the duration of the connection. Of course, while the ad hoc level 310 in FIG. 3 illustrates that the "ad hoc" level 310 falls between the "mine" level 304 and the "ours" level 306, this is for illustration purposes only and should not be viewed as limiting upon the disclosed subject matter. The level of trust afforded the "ad hoc" level 310 may be configurably placed in other locations of the hierarchy of trust levels, or be manually determined by the associated user.

According to various embodiments of the disclosed subject matter, while the above paragraphs regarding FIG. 3 describe how the integration framework 220 seeks for services from external computing devices when they are not available (or no feasibly executed on) the local computing device, the messages within the integration framework are not sent to the other computing devices. Generally speaking, when the integration framework 220 looks to obtain a service from a remote device according to a sensed event or signal, one or more services dedicated to communicating with remote devices are invoked to submit the request for the service to the remote device.

Regarding the pattern discussed above regarding FIG. 3, while locating services beginning with the "me" level and extending outward according to trust levels may be advantageously implemented on a user's own mobile computing device, there may be times that a different policy may be warranted. For example, parents may wish to be aware of or have control of various features that may be available on a child's mobile computing device. In such circumstances and according to a policy established by the parents for the child, the order of looking for a service may be altered: e.g., the parents may identify various services that are considered the most trusted (above those of the local computing device), the parents may limit the levels of trust where the integration framework 220 may seek for the requested service, and the like. Of course, businesses may also wish to implement policies for mobile devices which they provide to their employees.

Figure 5:
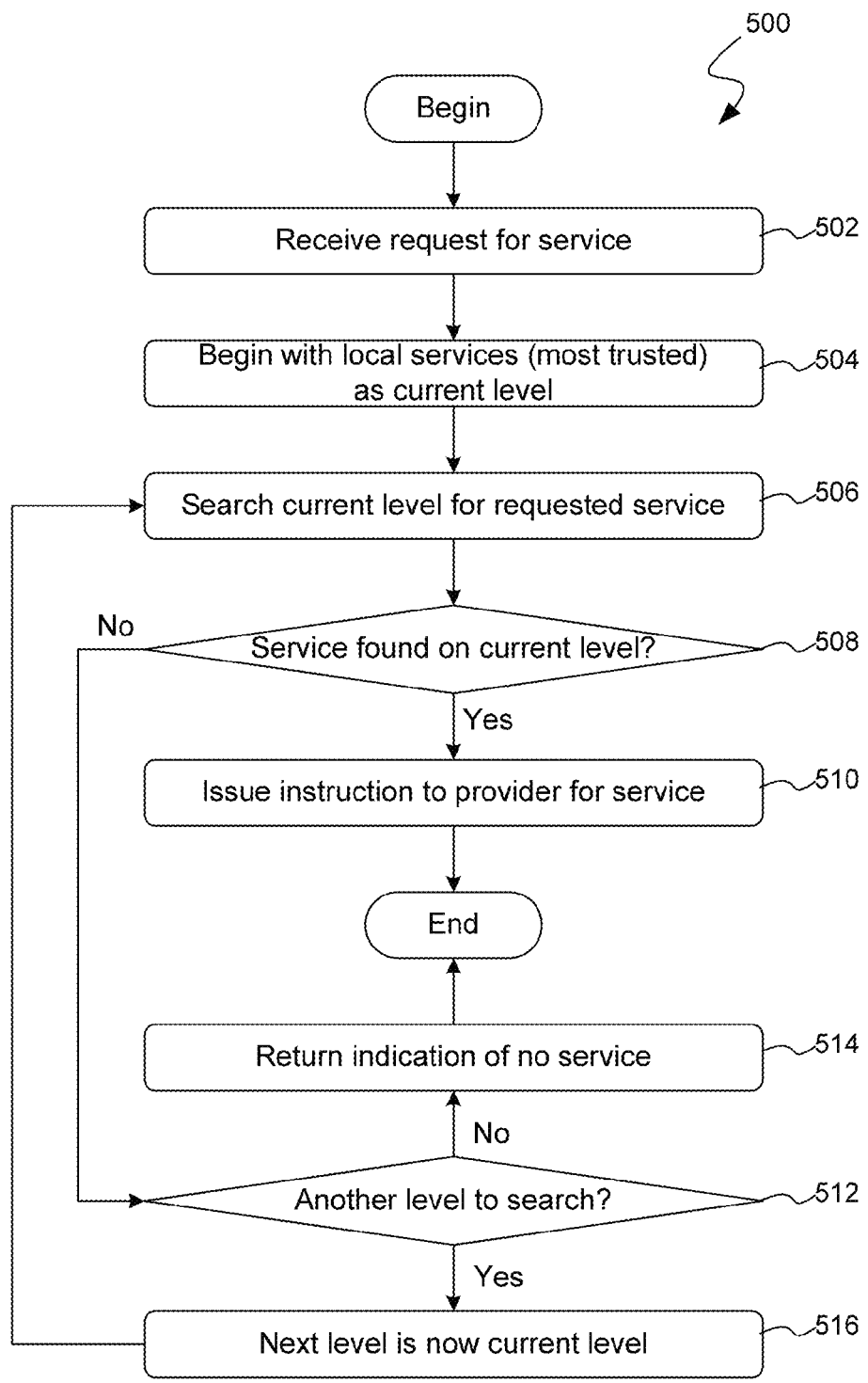
FIG. 5 illustrates a flow diagram of an exemplary routine for executing apps and services according to aspects of the disclosed subject matter.

Turning now to FIG. 5, FIG. 5 illustrates a flow diagram of an exemplary routine 500 for obtaining services according to aspects of the disclosed subject matter, such as may be implemented by an integration framework 220 on a user's mobile computing device 102. Beginning at block 502, a request is received for a service from a provider of services registered with the integration framework 220. At block 504, a search for a provider/service that would satisfy the request is begun with the local services, i.e., the services in the most trusted trust level (the "me" level 302 of trust.) At block 506, the current level (initially started at the most-trusted level) is searched for a registered service that would satisfy the request. At decision block 508, a determination is made as to whether the service is found on the current level of trust. If not, the routine 500 proceeds to decision block 412 as described below. However, if the requested service is found, i.e., can be completed by a provider at the current level, the routine 500 proceeds to block 510 where an instruction is issued to the found provider for the service. Thereafter, the routine 500 terminates.

At decision block 512, a determination is made as to whether there is another, lower level of trust for searching for services. If not, meaning that the requested service is not available, at block 514 the routine returns an indication that the requested service was not found. Alternatively, if there is another level to search, the routine 500 proceeds to block 516 where the next level of trust (as described above in regard to FIG. 3) is selected and the process returns to block 506 as described above.

Figure 6:
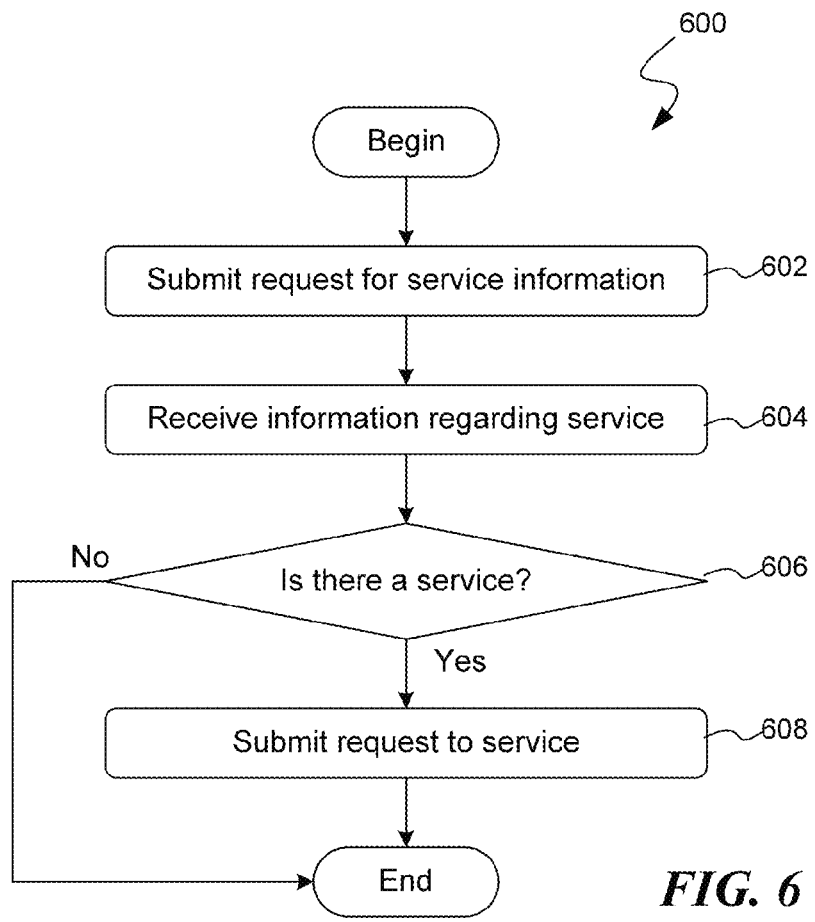
FIG. 6 illustrates a flow diagram of an exemplary routine for interacting with a client-side integration framework according to aspects of the disclosed subject matter.

Turning now to FIG. 6, FIG. 6 illustrates a flow diagram of an exemplary routine 600 for interacting with a client-side integration, integration framework according to aspects of the disclosed subject matter, such as may be made by a personal daemon. Beginning at block 602, a request for a service information regarding an app or service registered with the integration framework is submitted. At block 604, information regarding the service is received. At decision block 606, a determination is made as to whether or not the requested service information identifies a current available (the alternative being that the service is not available). If yes, the routine proceeds to block 608 where a request is submitted to the identified service. Thereafter, the routine 600 terminates.

Figure 7:
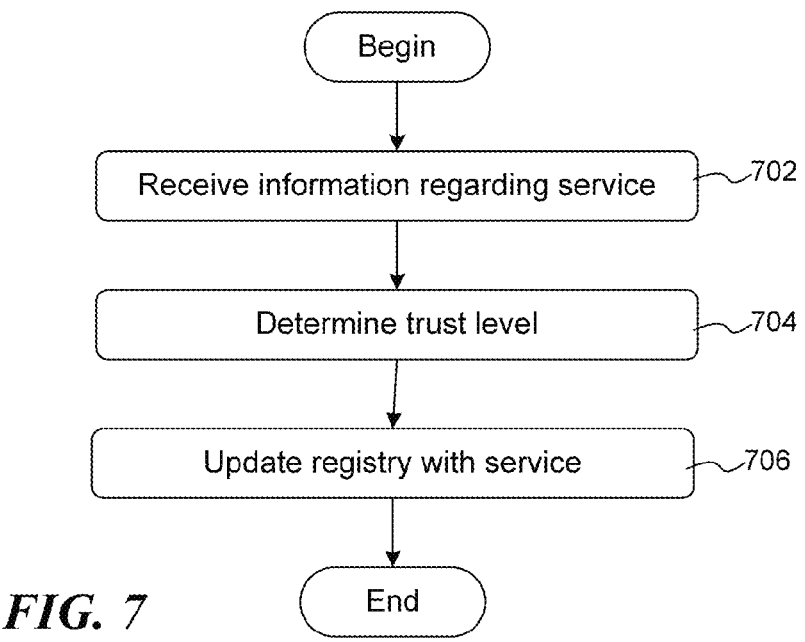
FIG. 7 illustrates a flow diagram of an exemplary routine for integrating apps and services into the hierarchy of the client-side integration framework.

FIG. 7 illustrates a flow diagram of an exemplary routine 700 for integrating services into the hierarchy of the client-side integration framework 220. Beginning at block 702, the integration framework 220 receives information regarding a service (or app or sensor via the input interface as discussed above.) At block 704, the integration framework 220 determines a trust level of the hierarchy of trust levels to be associated with the service. As indicated above, the trust levels may correspond to whether or not the service is available on the local device, on a sibling device, on a trusted network of devices, on an ad hoc network, or otherwise. At block 706, the registry of the integration framework 220 is updated with the information, including the associated trust level. Thereafter, the routine 700 terminates.

Figure 8:
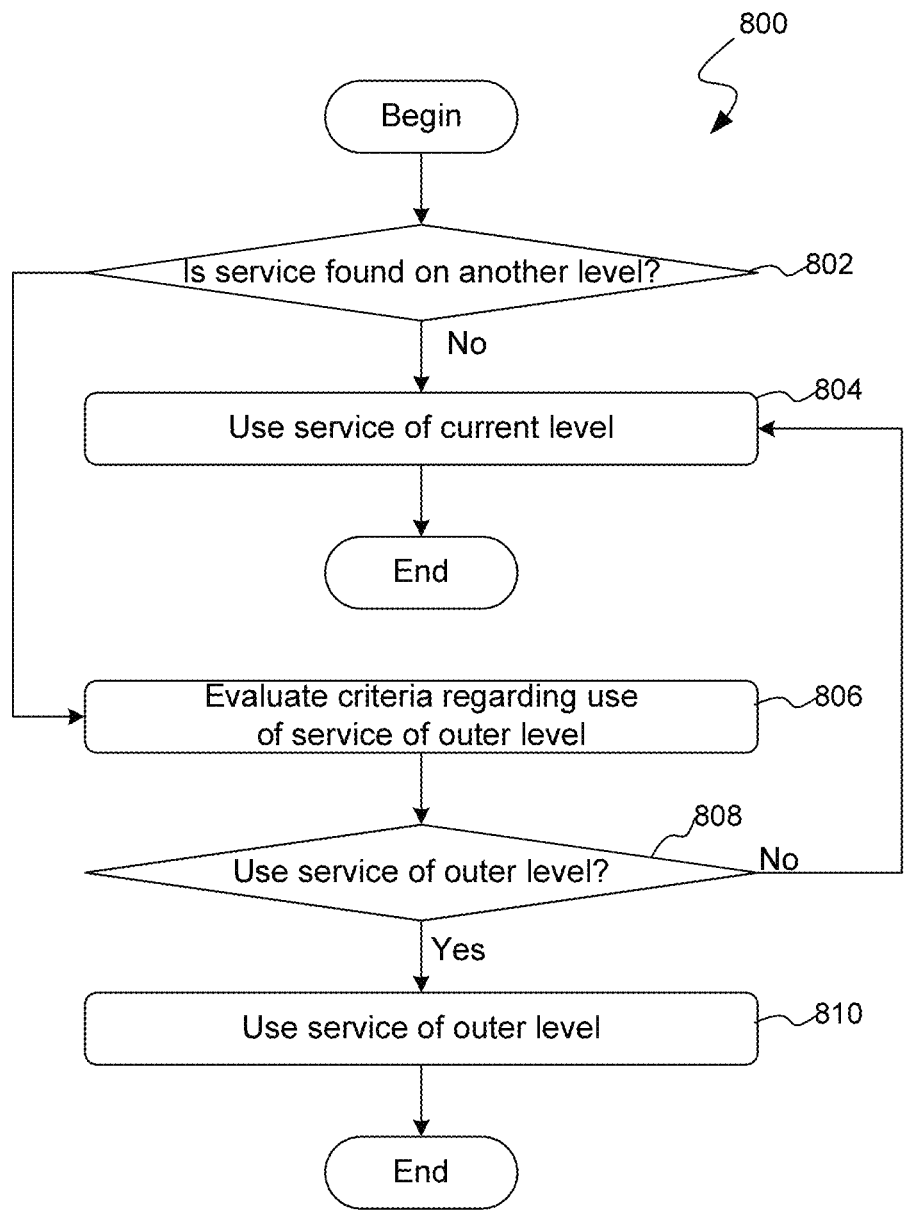
FIG. 8 is a flow diagram illustrating an exemplary routine for evaluating whether or not to use a service of an outer level even though the service may be available from a more trusted level.

Regarding the evaluation discussed above from FIG. 5 in regard to block 510 of routine 500, FIG. 8 is a flow diagram illustrating an exemplary routine 800 for evaluating whether or not to use a service of an outer level even though the service may be available from a more trusted level (e.g., on the local computing device.) Beginning at block 802, a determination is made as to whether the service, available at the current level (which may correspond to the most-trusted level, e.g., on the local computing device), is also available at another level in the trust hierarchy. If not, at block 804 the service at the current level is to be used and the routine 800 terminates. However, if the service is available at an outer level of trust, the routine proceed to block 806.

At block 806, various criteria regarding the use of a service of an outer level are evaluated. As indicated above, these criteria may include (by way of illustration and not limitation) whether the battery power of the current computing is low; whether the particular service is known to consume substantial amounts of power; the processing availability and capacity of another computing device and the local computing device; memory constraints; data availability to the local computing device vs. another computing device; network bandwidth capacity of the current device; network connectivity rates of the local computing device; time of day; data security issues; and the like. Based on the evaluation (or evaluations), at decision block 808 a determination is made as to whether to use the service of an outer level. If not, the routine 800 returns to block 804 where an indication is returned that the service at the current level is to be used, after which the routine 800 terminates. Alternatively, at block 810 an indication is returned to use the service at an outer level (in the hierarchy of trust) from the current level. Thereafter, the routine 800 terminates.

Regarding the various routines and processes describe above, while these routines/processes are expressed in regard to discrete steps to complete various tasks, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 500-800 may be carried out in parallel or in series. Often, but not exclusively, the functionality of the various routines is embodied in software (e.g., applications, system services, libraries, and the like) that is executed on computing devices as described in regard to FIG. 8. In various embodiments, all or some of the various routines may also be embodied in hardware modules, including but not limited to system on chips, specially designed processors and or logic circuits, and the like on a computer system.

These routines/processes are typically implemented in executable code comprising routines, functions, looping structures, selectors such as if-then and if-then-else statements, assignments, arithmetic computations, and the like. The exact implementation of each of the routines is based on various implementation configurations and decisions, including programming languages, compilers, target processors, operating environments, and the link. Those skilled in the art will readily appreciate that the logical steps identified in these routines may be implemented in any number of manners and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions store stored on the computer-readable storage devices are executed, they carry out various steps, methods and/or functionality, including those steps, methods, and routines described above in regard the various routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 9:
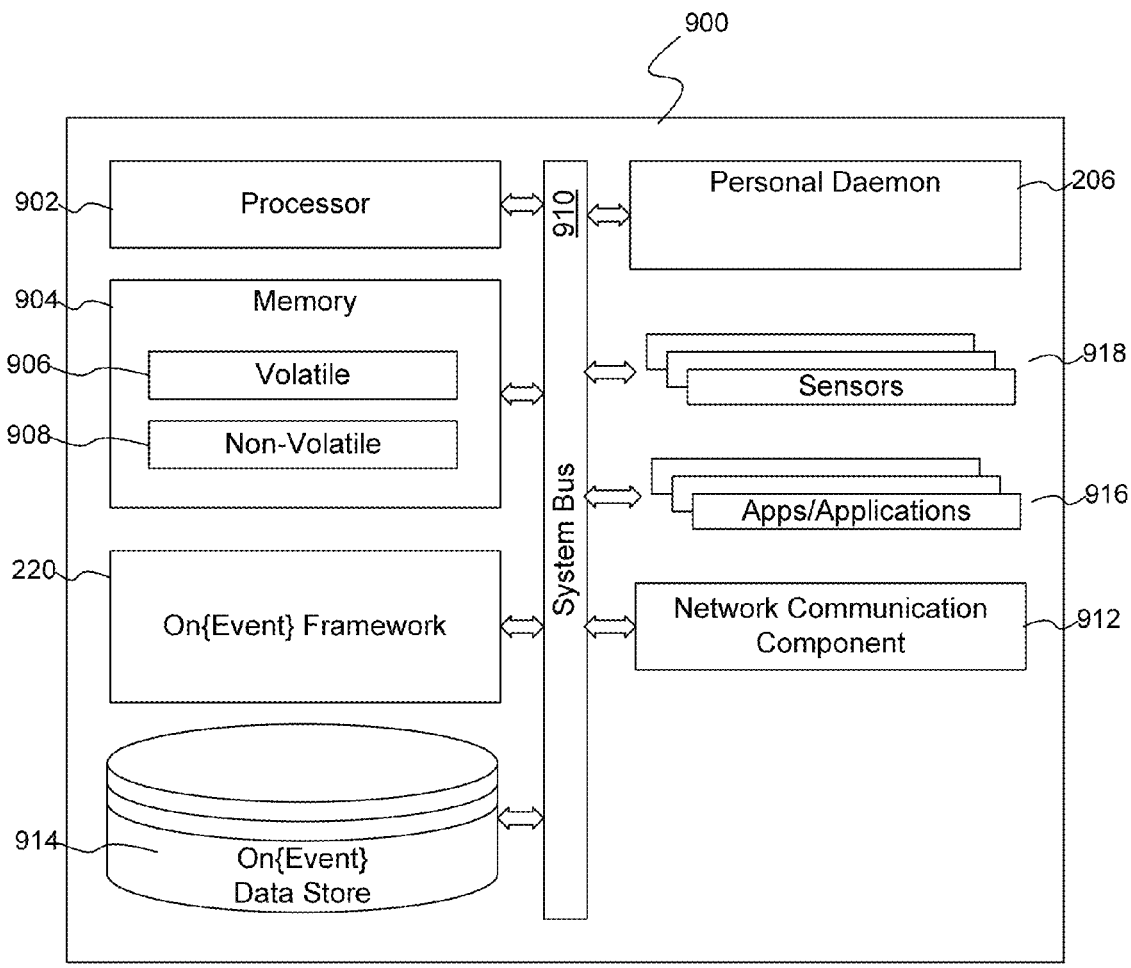
FIG. 9 illustrates a block diagram of an exemplary mobile computing device suitable for implementing aspects of the disclosed subject matter.

FIG. 9 illustrates a block diagram of an exemplary mobile computing device suitable for implementing aspects of the disclosed subject matter. The exemplary mobile computing device 900 includes a processor 902 (or processing unit) and a memory 904 interconnected by way of a system bus 910. As will be readily appreciated, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

The processor 902 executes instructions retrieved from the memory 904 in carrying out various functions, particularly in regard to executing a personal daemon 206 that provides personal assistance to the associated user. The processor 902 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: personal digital assistants, wearable computing devices, smart phone devices, tablet computing devices, phablet computing devices, laptop computers, desktop computers, and the like.

The system bus 910 provides an interface for the various components of the mobile device to inter-communicate. The system bus 910 can be of any of several types of bus structures that can interconnect the various components (including both internal and external components). The computing device 900 further includes a network communication component 912 for interconnecting the computing device 900 with other network accessible computers, online services, and/or network entities as well as other devices on the computer network 110. The network communication component 912 may be configured to communicate with the various computers and devices over the network 110 via a wired connection, a wireless connection, or both.

The computing device 900 also includes executable apps/applications 916. As those skilled in the art will appreciate, an application corresponds to a collection of executable instructions that carry out (through its execution on a processor) one or more tasks on a computing device, such as computing device 900. Applications are typically, but not exclusively, executed at the direction of a user of the computing device. Applications combine features available on the computing device in carrying out the various tasks (as designed by the composition of the application.) While the term "apps" is sometimes uses as a shorthand name for applications, in the alternative an app similarly corresponds to a collection of executable instructions for carrying out one or more tasks. However, in contrast to applications, apps typically, though not exclusively, are directed to a limited set of tasks, often focused to a narrow topic/feature. As the scope of an app is typically more limited than that of an application, apps typically require a smaller footprint with regard to system resources and are often more suited for execution by computing devices of limited resources. While apps/applications 918 are typically stored in memory 904, for illustration purposes only they are called out separately from the memory 904.

The exemplary computing device 900 also includes sensors 918. Typically, sensors correspond to various hardware devices that sense particular events relating to the computing device 900. Sensors 918 may include, by way of illustration and not limitation, accelerometers, haptic sensors, capacitive sensors, audio sensors, optic sensors, timers, temperature sensors, power sensors (AC vs. DC sensors, voltage sensors, etc.), wireless signal sensors, geo-location sensors, magnetic sensors, altimeters, barometric sensors, and the like. Sensors may be based on communication information, such as internet routing data, HTTP request/response inspection, MAC addresses, cellular/wireless triangulation, and the like. As those skilled in the art will appreciate, a suitably configured computing device 900 may various combinations of hardware sensors 918. Moreover, these hardware sensors, as well as software sensors (as will be discussed below), are used in monitoring the user context via an integration framework 220. As indicated above, the integration framework 220 is an extensible event/action framework, i.e., the framework detects events that occur with regard to the one or more sensors (including sensors 918) and, in response, executes actions associated with the detected events on the computing device 900. It is extensible in that sensors can be added, including software sensors, and subscribers can subscribe to sensed events. The integration framework 220 stores its information, including the Integration registry, in an Integration data store 914.

Regarding the integration framework 220, while those skilled in the art will appreciate that there may be a variety of alternatives to implement the framework, in one embodiment the framework 220 is implemented as a background service built upon the Node.js technology from Node.js Developers. The Node.js technology is extensible and robust such that it can interface with hardware sensors, such as sensors 918, as well as software sensors. Apps and applications, including apps/applications 916, interface with Node.js processes by way of JavaScript® code. Of course, while the integration framework 220 may be implemented using other technologies than Node.js, Node.js may be advantageously used as it enjoys a relatively small footprint on the host computing device, such as computing device 900, has configurations for deployment on a number of various operating system platforms, and JavaScript® programming languages enjoys broad support.

Regarding the various components of the exemplary computing device 900, those skilled in the art will appreciate that these components may be implemented as executable software modules stored in the memory of the computing device, as hardware modules (including SoCs—system on a chip), or a combination of the two. Moreover, each of the various components may be implemented as an independent, cooperative process or device, operating in conjunction with one or more computer systems. It should be further appreciated, of course, that the various components described above in regard to the exemplary computing device 900 should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method implemented by an integration framework executing on a user's computing device comprising at least a processor and a memory, comprising:
   receiving at the integration framework from the user a request for a service, the service being a service other than the integration framework and resides on at least one of: (i) the user's computing device or (ii) a device external to the user's computing device;
   accessing with the integration framework a registry of a plurality of services, the registry of a plurality of services residing on the at least one of: (i) the user's computing device or (ii) a device external to the user's computing device , wherein each of the plurality of services is associated with a trust level of a hierarchy of trust levels;
   iteratively searching the registry for a provider of the requested service according to the hierarchy of trust levels, the searching of the registry beginning with the most trusted level of the trust levels, such that providers associated with a more trusted trust level are searched before providers of a less trusted trust level are searched until a provider of the requested service is found or until all levels of the hierarchy are searched without finding a provider of the requested service; and
   upon finding a provider of the requested service, causing an instruction to the found provider of the requested service thereby causing the found provider to provide the service for the user.

2. The computer implemented method of claim 1, wherein providers of the plurality of services associated with a most trusted trust level are providers available on the user's computing device.

3. The computer implemented method of claim 2, wherein providers of the plurality of services associated with a second most trusted trust level are providers available on a sibling computing device.

4. The computer implemented method of claim 3, wherein providers of the plurality of services associated with a third most trusted trust level are providers available on devices of a network that the associated user is authorized to access.

5. The computer implemented method of claim 3, wherein the requested service is available from a first provider available on the user's computing device and a second provider available on a sibling computing device, and wherein the method further comprises:

evaluating whether to obtain the service from the first provider or the second provider according to one or more criteria; and upon determining to obtain the service from the second provider according to the one or more criteria, determining the second provider as the found provider of the requested service.

6. The computer implemented method of claim 5, wherein the one or more criteria comprises a determination of the power available on the user's computing device.

7. The computer implemented method of claim 5, wherein the one or more criteria comprises a determination of the resources available to the user's computing device and the sibling computing device.

8. The computer implemented method of claim 5, wherein the one or more criteria comprises a determination of the network connectivity available to the user's computing device.

9. A computer implemented method implemented by an integration framework executing on a user's computing system comprising at least a processor and a memory, comprising:

receiving at the integration framework from the user a request for a service, the service being a service other than the integration framework and resides on at least one of: (i) the user's computing device or (ii) a device external to the user's computing device;

accessing with the integration framework a registry of a plurality of services, the registry of a plurality of services residing on the at least one of: (i) the user's computing device or (ii) a device external to the user's computing device, wherein each of the plurality of services is associated with a trust level of a hierarchy of trust levels;

iteratively searching the registry for a provider of the requested service according to the hierarchy of trust levels, the searching of the registry beginning with the most trusted level of the trust levels, such that providers associated with a more trusted trust level are searched before providers of a less trusted trust level are search, until a provider of the requested service is found or until all levels of the hierarchy are searched without finding a provider of the requested service; wherein the requested service is available from a first provider available on the user's computing device and a second provider available on a sibling computing device, and wherein the method further comprises:

evaluating whether to obtain the service from the first provider or the second provider according to one or more criteria; and upon determining to obtain the service from the second provider according to the one or more criteria, determining the second provider as the found provider of the requested service; and upon finding a provider of the requested service, causing an instruction to the found provider of the requested service thereby causing the found provider to provide the service for the user.

10. The computer implemented method of claim 9, wherein providers of the plurality of services associated with a most trusted trust level are providers available only on the user's computing device.

11. The computer implemented method of claim 9, wherein providers of the plurality of services associated with a second most trusted trust level are providers available only on a sibling computing device.

12. The computer implemented method of claim 9, wherein the computing device is associated with a user, and wherein providers of the plurality of providers associated with a third most trusted trust level are providers available on devices of a network that the associated user is authorized to access.

13. The computer implemented method of claim 9, wherein the one or more criteria comprises a determination of the power available on the user's computing device.

14. The computer implemented method of claim 9, wherein the one or more criteria comprises a determination of the resources available to the user's computing device and the sibling computing device.

15. The computer implemented method of claim 9, wherein the one or more criteria comprises a determination of the network connectivity available to the user's computing device.

16. A computer system comprising a processor and a memory, wherein the processor executes instructions stored in and interactively retrieved from the memory as part of or in conjunction with additional components, the additional components comprising:

a plurality of hardware sensors disposed on the computer system, each sensor being a provider of a service;

a plurality of apps installed on the computer system, each app being a provider of a service; and an integration framework that maintains a registry of providers of services on the computer system, wherein the providers of services includes the plurality of sensors and the plurality of apps, and further includes a plurality of providers of services from devices external to the computer system, wherein each of the providers of services in the registry are associated with a trust level of a hierarchy of trust levels, and wherein the processor executes instructions which cause the integration framework to, in response to a request for a service:

iteratively search the registry for a provider of the requested service according to the hierarchy of trust levels, beginning with the most trusted level of the trust levels, such that providers of services associated with a more trusted trust level are searched before providers of services of a less trusted trust level are searched, until a provider of the requested service is found or until all levels of the hierarchy are searched without finding a provider of the requested service; and upon finding a provider of the requested service, issuing an instruction to the requested service to provide the service for the user in response to the request.

17. The computer system of claim 16, wherein providers of services associated with a most trusted trust level of the hierarchy of trust levels are providers of services available on the computer system, and wherein providers of services associated with a second most trusted trust level of the hierarchy of trust levels are providers of services available on a sibling computing device.

18. The computer system of claim 17, wherein the computer device is associated with a user, and wherein providers of services associated with a third most trusted trust level of the hierarchy of trust levels are providers of services available on devices of a network that the associated user is authorized to access.

19. The computer system of claim 18, wherein the integration framework is configured to determine that the requested service is available from a first provider of services available on the computer system and a second provider of services available on a sibling computer system, and is further configured to:
  evaluate whether to obtain the service from the first provider of services or the second provider services according to one or more criteria; and
  upon determining to obtain the service from the second provider of services according to the one or more criteria, determine the second provider as the found provider of the requested service.

* * * * *